US012664688B2

(12) United States Patent
Du et al.

(10) Patent No.: US 12,664,688 B2
(45) Date of Patent: Jun. 23, 2026

(54) ONLINE CAMERA ALIGNMENT USING ENSEMBLED FEATURES FROM MULTIPLE VIEWS

(71) Applicant: GM GLOBAL TECHNOLOGY OPERATIONS LLC, Detroit, MI (US)

(72) Inventors: Xinyu Du, Oakland Township, MI (US); Xiaobo Guo, Northville, MI (US); Mohsen Khalili, Sterling Heights, MI (US); Yao Hu, Sterling Heights, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 18/741,218

(22) Filed: Jun. 12, 2024

(65) Prior Publication Data

US 2025/0384584 A1 Dec. 18, 2025

(51) Int. Cl.
| | |
|---|---|
| *G06T 7/80* | (2017.01) |
| *G06V 10/82* | (2022.01) |
| *G06V 20/56* | (2022.01) |
| *H04N 7/18* | (2006.01) |

(52) U.S. Cl.
CPC ............... *G06T 7/80* (2017.01); *G06V 10/82* (2022.01); *G06V 20/56* (2022.01); *H04N 7/181* (2013.01); *G06T 2207/20081* (2013.01); *G06T 2207/20084* (2013.01); *G06T 2207/30252* (2013.01)

(58) Field of Classification Search
CPC ............. G06T 7/80; G06T 2207/20081; G06T 2207/20084; G06T 2207/30252; G06V 10/82; G06V 20/56; H04N 7/181

USPC ........... 348/148, 159, 47; 382/103, 173, 151
See application file for complete search history.

(56) References Cited

U.S. PATENT DOCUMENTS

| | | | |
|---|---|---|---|
| 8,373,763 B2 | 2/2013 | Zhang et al. | |
| 10,558,868 B2* | 2/2020 | Zhao | G06T 7/00 |
| 11,428,541 B1 | 8/2022 | Khalili et al. | |
| 2018/0025508 A1* | 1/2018 | Lee | G06T 7/73 |
| | | | 382/154 |
| 2019/0102923 A1* | 4/2019 | Voisin | H04N 13/344 |
| 2019/0103026 A1* | 4/2019 | Liu | G06V 10/25 |
| 2021/0024096 A1* | 1/2021 | Wang | G06V 20/588 |
| 2021/0056713 A1* | 2/2021 | Rangesh | G01S 17/89 |
| 2022/0036097 A1* | 2/2022 | Ogino | G01C 7/04 |
| 2022/0122001 A1* | 4/2022 | Choe | G06N 20/20 |

(Continued)

OTHER PUBLICATIONS

U.S. Appl. No. 18/169,081, filed Feb. 14, 2023, Du et al.
U.S. Appl. No. 18/169,352, filed Feb. 15, 2023, Li et al.

*Primary Examiner* — Asmamaw G Tarko

(57) ABSTRACT

A vehicle system includes one or more cameras configured to capture original images relative to a vehicle, and a control module configured to receive at least two original images from the one or more cameras of the vehicle, identify at least one target feature in the original images, select local regions of interest for the identified target feature in the original images, load view settings for each local region of interest, create one or more synthetic local images for each original image based on the local regions of interest and the loaded view settings, detect at least one feature in the one or more synthetic local images, and align the camera with an object associated with the vehicle using the detected feature. Other example vehicle systems and methods are also disclosed.

20 Claims, 9 Drawing Sheets

(56)            References Cited

U.S. PATENT DOCUMENTS

| 2023/0215026 | A1 | | 7/2023 | Du et al. | |
|---|---|---|---|---|---|
| 2023/0256975 | A1 | | 8/2023 | Li et al. | |
| 2023/0260157 | A1 | | 8/2023 | Li et al. | |
| 2023/0260291 | A1 | | 8/2023 | Li et al. | |
| 2023/0382427 | A1 | * | 11/2023 | Wolff | .................. G06N 3/0464 |

* cited by examiner

ONLINE CAMERA ALIGNMENT USING ENSEMBLED FEATURES FROM MULTIPLE VIEWS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to online camera alignment using ensembled features from multiple views.

Vehicles include onboard cameras to provide information about the surrounding environment that can be used for various operations of the vehicles. For instance, some vehicles (e.g., autonomous vehicles, semi-autonomous vehicles, etc.) may rely on cameras having different perspectives of the surrounding environment to plan and/or control operations of the vehicle, such as a motion and/or a trajectory. In such examples, camera alignments empower such vehicles with 360 degree viewing and autonomous driving features. Such alignments include camera-to-vehicle alignment, camera-to-camera alignment, and camera-to-ground alignment.

SUMMARY

A vehicle system includes one or more cameras configured to capture original images relative to a vehicle, and a control module in communication with the camera. The control module is configured to receive at least two original images from the one or more cameras of the vehicle, identify at least one target feature in the original images, select local regions of interest for the identified target feature in the original images, load view settings for each local region of interest, the view settings for each local region of interest including at least a size and a resolution, create one or more synthetic local images for each original image based on the local regions of interest and the loaded view settings, detect at least one feature in the one or more synthetic local images, and align the camera with an object associated with the vehicle using the detected feature, wherein the object is the vehicle, the ground, or another camera of the vehicle.

In other features, the control module is configured to control an operation of the vehicle based on the alignment between the camera and the object.

In other features, the control module is configured to adjust at least one of the view settings for the local regions of interest.

In other features, the control module is configured to determine inlier ratios associated with a plurality of detected features and remove at least one of the view settings corresponding to the lowest inlier ratio of the inlier ratios to adjust the at least one of the view settings.

In other features, the vehicle system further includes a machine learning module configured to generate the view settings for each local region of interest. The control module is configured to receive the view settings for each local region of interest from the machine learning module.

In other features, the machine learning module includes a neural network.

In other features, the control module is configured to determine inlier ratios associated with a plurality of detected features, and the machine learning module is configured to adjust the at least one of the view settings for the local regions of interest based on the determined inlier ratios.

In other features, the control module is configured to generate a transformation matrix to map the detected feature between the synthetic local images and at least one of the original images.

In other features, the control module is configured to project the target feature back to the at least one of the original images based on the transformation matrix.

In other features, a vehicle includes the vehicle system.

A method for aligning one or more cameras of a vehicle with an object associated with the vehicle, includes receiving at least two original images from the one or more cameras, identifying at least one target feature in the original images, selecting local regions of interest for the identified target feature in the original images, loading view settings for each local region of interest, the view settings for each local region of interest including at least a size and a resolution, creating one or more synthetic local images for each original image based on the local regions of interest and the loaded view settings, detecting at least one feature in the one or more synthetic local images, and aligning the camera with an object associated with the vehicle using the detected feature, wherein the object is the vehicle, the ground, or a second camera of the vehicle.

In other features, the method further includes controlling an operation of the vehicle based on the alignment between the camera and the object.

In other features, the method further includes adjusting at least one of the view settings for the local regions of interest.

In other features, adjusting the at least one of the view settings for the local regions of interest includes determining inlier ratios associated with a plurality of detected features and removing at least one of the view settings corresponding to the lowest inlier ratio of the inlier ratios to adjust the at least one of the view settings.

In other features, loading the view settings for each local region of interest includes generating, with a machine learning module, the view settings for each local region of interest.

In other features, adjusting the at least one of the view settings for the local regions of interest includes determining inlier ratios associated with a plurality of detected features and adjusting, with the machine learning module, the at least one of the view settings for the local regions of interest based on the determined inlier ratios.

In other features, the method further includes generating a transformation matrix to map the detected feature between the synthetic local images and at least one of the original images.

In other features, the method further includes projecting the target feature back to the at least one of the original images based on the transformation matrix.

A non-transitory computer-readable medium storing instructions that, when executed by a control module, cause the control module to receive at least two original images from one or more cameras of a vehicle, identify at least one target feature in the original images, select local regions of interest for the identified target feature in the original images, load view settings for each local region of interest, the view settings for each local region of interest including at least a size and a resolution, create one or more synthetic local images for each original image based on the local regions of interest and the loaded view settings, detect at least one feature in the one or more synthetic local images, and align the camera with an object associated with the vehicle using the detected feature, wherein the object is the vehicle, the ground, or a second camera of the vehicle.

In other features, the control module is further caused to control an operation of the vehicle based on the alignment between the camera and the object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include onboard cameras to provide information about the surrounding environment that can be used for various control operations of the vehicles, such as motion and/or trajectory of the vehicles. In such examples, the vehicles (e.g., autonomous vehicles, semi-autonomous vehicles, etc.) rely on one or more camera alignments, such as camera-to-vehicle alignment, camera-to-camera alignment, and camera-to-ground alignment. Current methods for camera alignments are based on feature detection and matching with holistic and original perspective views. However, in many cases, the degradation of accuracy and convergence time for camera alignments occurs causing poor feature matching results. In turn, the accuracy and reliability of vehicle control operations, such as autonomous driving features may be reduced, resulting in potential hazards for individuals (e.g., drivers, passengers, bystanders, etc.).

The vehicle systems and methods according to the present disclosure provide a technical approach to enable online camera alignment using features from one or more created views of one or more original images based on various characteristics, such as view angles, resolutions and/or regions of interest along with automatic tuning techniques. With this approach of camera alignment using features from one or more created views, algorithm performance and robustness for camera alignment are improved. As a result, camera alignment accuracy is increased, which results in improved performance of mapping, perception, localization, etc. and in turn vehicle control operations. Additionally, through the automatic tuning techniques described herein, parameter settings of the different views may be automatically determined, which can reduce calibration efforts.

Figure 1:
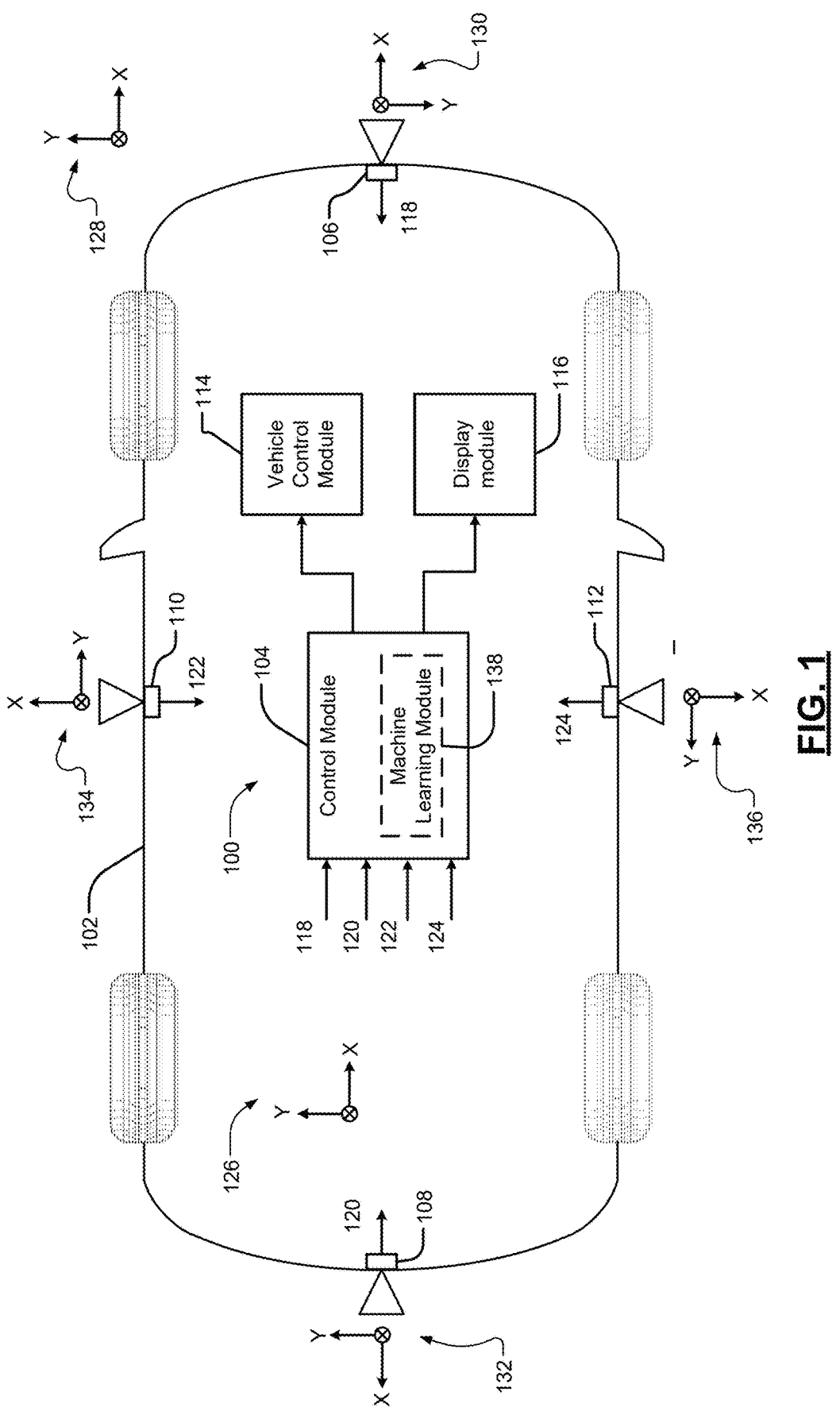
FIG. 1 is a block diagram of an example vehicle system for online camera alignment in a vehicle, according to the present disclosure.

Referring now to FIG. 1, a block diagram of an example vehicle system 100 is presented for aligning at least one camera of a vehicle 102 with an object associated with the vehicle 102. As shown in FIG. 1, the vehicle system 100 generally includes a control module 104, cameras 106, 108, 110, 112, a vehicle control module 114, and a display module 116. Although FIG. 1 illustrates the vehicle system 100 as including specific dedicated modules, it should be appreciated that one or more other modules may be employed if desired. For example, any combination of the modules (e.g., the control module 104, the vehicle control module 114, the display module 116, etc.) and/or the functionality thereof may be integrated into a single module or multiple different modules. Additionally, although FIG. 1 illustrates four specifically arranged cameras 106, 108, 110, 112, it should be appreciated that any number of cameras can be arranged on the vehicle 102.

In the example of FIG. 1, the cameras 106, 108, 110, 112, the vehicle control module 114, and the display module 116 are in communication with the control module 104. In such examples, the modules and cameras of the vehicle system 100 may share parameters via a network, such as a controller area network (CAN) and signals. For example, in FIG. 1, the control module 104 receives signals 118, 120, 122, 124 representing image (or image data) from the cameras 106, 108, 110, 112, respectively.

The vehicle system 100 of FIG. 1 may be employable in any suitable vehicle, such as an autonomous vehicle, a semi-autonomous vehicle, etc. Additionally, the vehicle system 100 may be applicable to electric vehicles (e.g., a pure electric vehicle, a plug-in hybrid electric vehicle, etc.) and internal combustion engine (ICE) vehicles. In the example of FIG. 1, the vehicle system 100 is employed in the vehicle 102 (e.g., an autonomous vehicle). In this example, the vehicle 102 has an associated vehicle-centered coordinate system 126, in which the X-axis extends to the right (e.g., to the front of the vehicle 102), the Y-axis extends to the left (e.g., the left side of the vehicle 102), and the Z-axis (not shown) points upward. A ground-centered coordinate system 128 defines a reference frame of the ground or terrain outside of the vehicle 102. The ground-centered coordinate system 128 includes similar axes as the vehicle-centered coordinate system 126 but having a different center point (0, 0, 0).

In FIG. 1, the cameras 106, 108, 110, 112 capture original images relative to the vehicle 102. In this example, the cameras 106, 108, 110, 112 are directed to different surrounding areas of the vehicle 102 and provide different perspectives. For example, the camera 106 is a front camera, the camera 108 is a rear camera, the camera 110 is a left-side camera, and the camera 112 is a right-side camera. In various embodiments, the cameras 106, 108, 110, 112 can be wide-angle cameras, fish-eye cameras, etc. In such examples, non-linear distortions or optical aberrations may occur at the edges of their fields of view. In other examples, the cameras 106, 108, 110, 112 may be other suitable types of sensors if desired.

Each camera 106, 108, 110, 112 of FIG. 1 has an associated coordinate system that defines a reference frame for that camera. For example, the front camera 106 has an associated front coordinate system 130, the rear camera 108 has an associated rear coordinate system 132, the left-side camera 110 has an associated left coordinate system 134, and the right-side camera 112 has an associated right coordinate system 136. For each camera's coordinate system 130, 132, 134, 136, the Z-axis generally extends away from the camera along the principal axis of the camera and the Y-axis points toward the ground. In FIG. 1, the coordinate systems 130, 132, 134, 136 of the cameras 106, 108, 110, 112 are right-handed. As such, for the front camera 106, the X-axis extends to the right of the vehicle 102, for the rear camera 108, the X-axis extends to the left of the vehicle 102, for the left-side camera 110, the X-axis extends to the front of the vehicle 102, and for the right-side camera 112, the X-axis extends to the rear of the vehicle 102. Although FIG. 1 illustrates specifically arranged coordinate systems for the cameras 106, 108, 110, 112, it should be appreciated that other suitable coordinate systems (e.g., different axes, etc.) may be employed.

Figure 2:
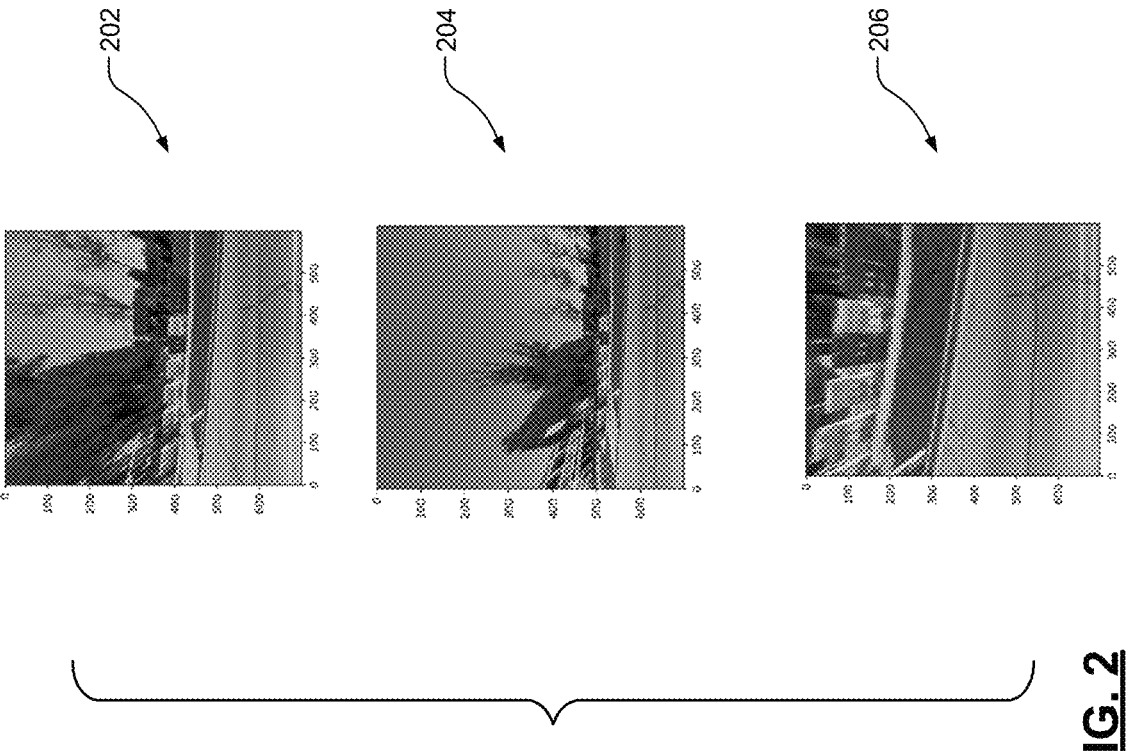
FIG. 2 depicts an original image captured by a camera and synthetic local images created based on the original image, according to the present disclosure.
Figure 2:
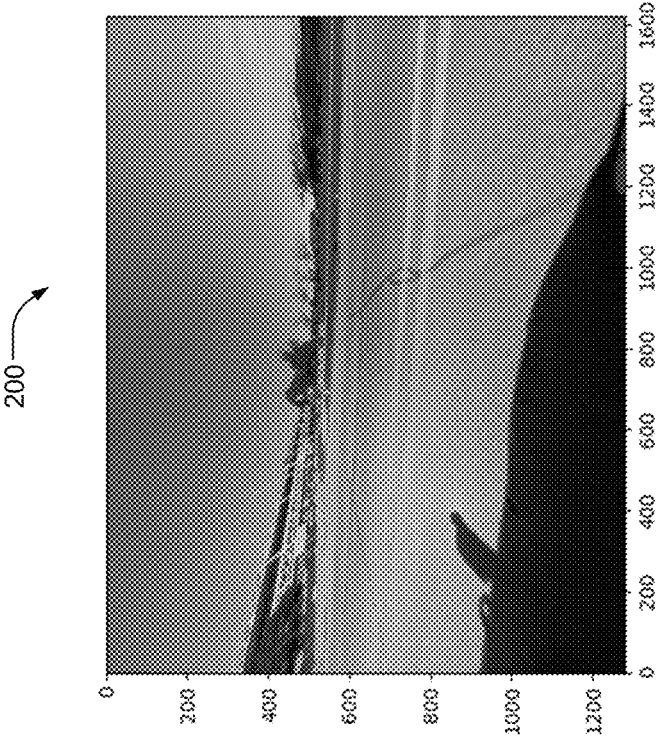

In various embodiments, the vehicle system 100 of FIG. 1 enables the online alignment of any one or more of the cameras of the vehicle 102, such as the cameras 106, 108, 110, 112 using ensembled features from multiple, generated views. For example, the control module 104 loads or otherwise receives original images (or data representing the original image) from any one of the cameras 106, 108, 110, 112 via the signals 118, 120, 122, 124. For example, the control module 104 may receive multiple images from the same camera or different cameras, which can be used for vehicle and ground-based alignments (e.g., camera-to-vehicle alignment, camera-to-ground alignment, etc.) and/or camera-to-camera alignments. For instance, for vehicle and ground-based alignments, the control module 104 may receive (or load) two consecutive original images (e.g. frames) from the same camera for processing. In other examples, for camera-to-camera alignments, the control module 104 may receive (or load) two different original images having the same timestamp from two different cameras. Then, the control module 104 creates one or more synthetic local images based on each received original image, as further explained herein. For example, FIG. 2 depicts an original image 200 received by the control module 104 from the left-side camera 110 of FIG. 1, and synthetic local images 202, 204, 206 created by the control module 104 based on the original image 200. In the example of FIG. 2, the synthetic local images 202, 204, 206 may have different view settings (e.g., resolution, size, etc.).

After the original images are received, the control module 104 then identifies at least one target feature in one or more of the original images. In various embodiments, the control module 104 may identify each target feature in the original image(s), only one target feature in the original image(s), a select number of target features in the original image(s), etc.

In the example of FIG. 1, the control module 104 may identify the target feature in the original image by any suitable manner. For example, the control module 104 may detect the target feature in the original image by using a suitable image segmentation method (e.g., Detectron, etc.) to partition the original image into multiple image segments (e.g., sets of pixels). In various embodiments, the image segmentation method may be capable of detecting, for example, plane targets, such as buildings, the ground, etc. In other examples, the target feature may be a pre-selected target feature by using a predefined region of interest in the original image.

Figure 3:
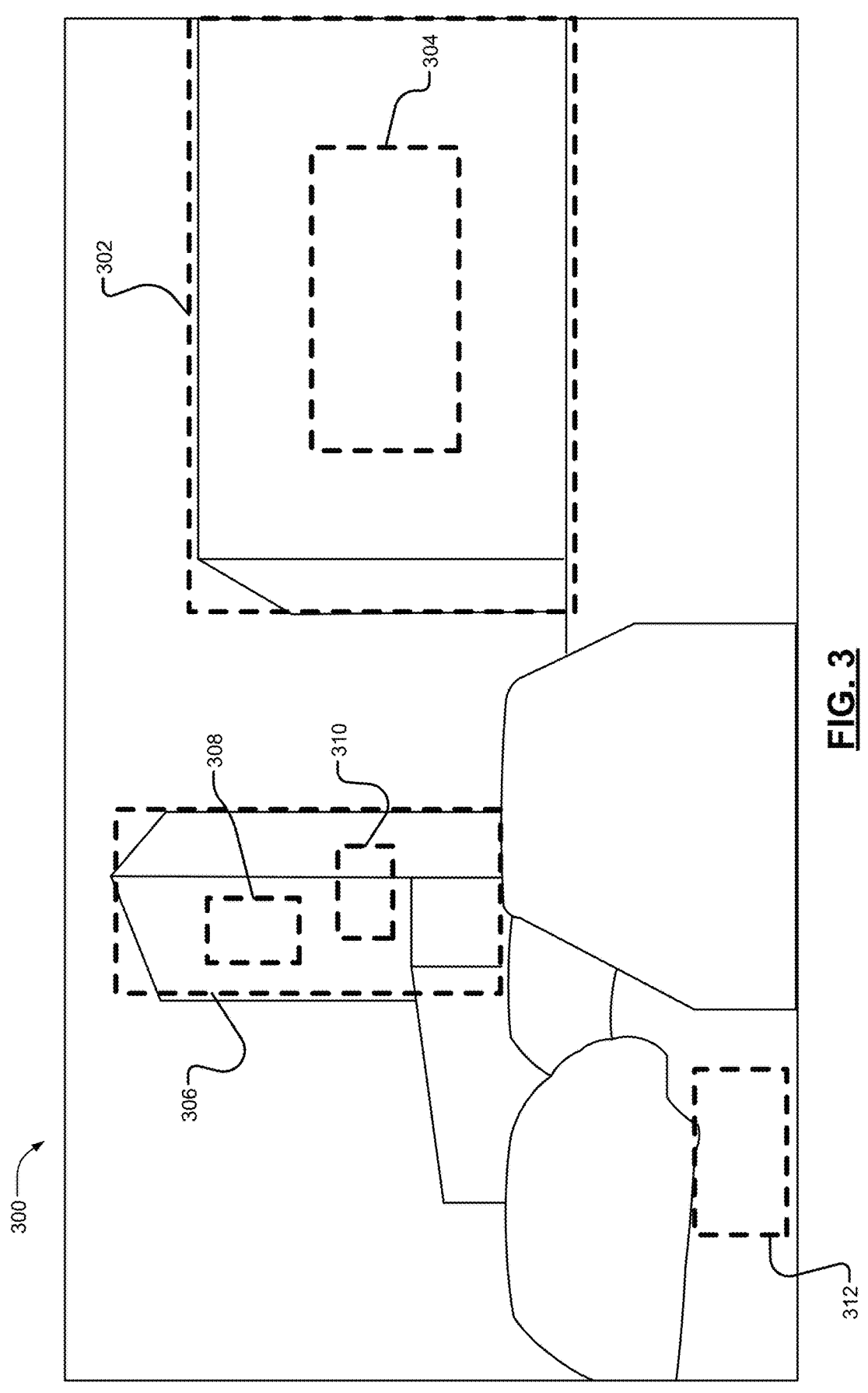
FIG. 3 depicts an original image captured by a camera and having identified different target features and local regions of interest, according to the present disclosure.

Next, the control module 104 selects local regions of interest for the identified target feature in the original image(s). In various embodiments, the control module 104 may select various local regions of interest. For example, FIG. 3 depicts an original image 300 (e.g., from the front camera 106 of FIG. 1) including multiple buildings and vehicles in front of the vehicle 102 of FIG. 1. In this example, the control module 104 may identify different target features (e.g., different buildings, a lane line, etc.) in the original image 300. Then, the control module 104 selects local regions of interest for at least one of the target features in the original image 300. In the example of FIG. 3, the control module 104 may select two local regions of interest (represented by boxes 302, 304) for one building, three local regions of interest (represented by boxes 306, 308, 310) for another building, and a local region of interest (represented by a box 312) for a lane line on a roadway (not shown).

In various embodiments, the size and resolution associated with each local region of interest may be determined. For example, in some embodiments, the control module 104 may load or otherwise receive view settings for each local region of interest. In such examples, the view settings for each local region of interest may include at least a size and a resolution. With this configuration, the local regions of interest may have different sizes (e.g., as shown in FIG. 3) and/or resolutions. In various embodiments, the view settings may be adjusted or optimized, as further explained below.

Then, the control module 104 creates one or more synthetic local images for each received original image based on the local regions of interest and the loaded view settings. In such examples, each synthetic local image may be created for one local region of interest and have different resolutions obtained according to the view settings, as shown in the synthetic local images 202, 204, 206 of FIG. 2. In various embodiments, the synthetic local images may include birds eye views, views of different perspectives, etc.

Next, the control module 104 detects at least one feature in the one or more synthetic local images. For example, the control module 104 may implement any suitable technique for feature detection in the synthetic local images. As one example, the control module 104 may detect one or more feature pairs in the multiple synthetic local images (e.g., different views) by matching corresponding features in the synthetic local images.

The control module 104 then generally projects the detected feature(s) back to the original image(s) (e.g., back to the original camera coordinate). The control module 104 may implement any suitable technique for projecting the detected feature(s) back to the original image(s). For example, in various embodiments, the control module 104 may generate one or more transformation matrices to map the detected feature between the synthetic local images and the original image.

For instance, the generated transformation matrix may be a homography transformation matrix for mapping the detected feature between the synthetic local images and one of the original images. For example, a homography transformation matrix may be calculated if four points (image coordinates) of a local region of interest in the original image (o) are known and corresponding four points for a synthetic local image or view (v) are known. In such examples, the homography transformation matrix $$(H_o^v \text{ and } H_v^o)$$

may be calculated using a singular value decomposition (SVD) method or a least square method. Equation (1) below shows an example of a homography transformation matrix H used to map between points (x, y, 1) of one image (e.g., the original image) and points (e.g., x', y', 1) of another image (e.g., the synthetic local image).

$$s\begin{bmatrix} x' \\ y' \\ 1 \end{bmatrix} = H\begin{bmatrix} x \\ y \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix}\begin{bmatrix} x \\ y \\ 1 \end{bmatrix} \qquad \text{Equation (1)}$$

For example, for each feature pair $A_i$ in synthetic local images/views, the control module 104 can construct a matrix according to equation (2) below. Then, the homography transformation matrix (e.g., the homography transformation matrix H above) can be rewritten according to equation (2) below. In this example, the rewritten homography transformation matrix is represented by h. Next, if the least square method is employed, the control module 104 can solve the least square with four pairs of features, as shown in equation (4) below.

$$A_i = \begin{bmatrix} -x & -y & -1 & 0 & 0 & 0 & xx' & yx' & x' \\ 0 & 0 & 0 & -x & -y & -1 & xy' & yy' & y' \end{bmatrix} \qquad \text{Equation (2)}$$

$$h = [\, h_1 \quad h_2 \quad h_3 \quad h_4 \quad h_5 \quad h_6 \quad h_7 \quad h_8 \quad h_9 \,]^T \qquad \text{Equation (3)}$$

$$\min(\|Ah\|), \; \|h\| = 1 \qquad \text{Equation (4)}$$

Then, the control module 104 can project any feature from any synthetic local image back to the original image (and vice versa) based on the generated transformation matrix. For example, equation (5) below shows a feature $$f_i^o$$

in a homogeneous coordinate being projected from a synthetic local image or view (v) to an original image (o), whereas equation (6) below shows a feature $$f_i^v$$

a homogeneous coordinate being projected from the original image (o) to the synthetic local image or view (v).

$$f_i^o = H_v^o \times f_i^v \qquad \text{Equation (5)}$$

$$f_i^v = H_o^v \times f_i^o \qquad \text{Equation (6)}$$

With continued reference to FIG. 1, the control module 104 can then perform one or more alignments, such as camera-to-camera alignment, camera-to-vehicle alignment, and camera-to-ground alignment. More specifically, the control module 104 can align the camera 106, 108, 110, 112 capturing the original image with an object associated with the vehicle 102 using the detected feature in the synthetic local image(s). For example, if the front camera 106 captured the original image, the control module 104 can use the detected feature (e.g., a feature pair) to align that camera 106 with another camera/sensor (e.g., any one or more of the cameras 108, 110, 112, etc.) in the vehicle 102, the vehicle 102 itself, or the ground. This is generally accomplished via the coordinate systems 130, 132, 134, 136 for particular cameras, the vehicle-centered coordinate system 126, and the ground-centered coordinate system 128 explained above.

In various embodiments, the control module 104 may adjust at least one of the view settings for the local regions of interest. In doing so, the adjusted view setting(s) may be optimized to obtain more accurate results. This adjustment of the view setting(s) may be achieved in various different manners.

For example, the control module 104 may adjust a view setting based on inlier ratios associated with a plurality of detected features or feature pairs. In such examples, the control module 104 may calculate or otherwise determine inlier ratios associated with multiple detected features or feature pairs. In such examples, the inlier ratios may include feature matching inlier ratios and/or essential matrix inlier ratios. Then, the control module 104 can remove the view setting(s) corresponding to the lowest inlier ratio of the determined inlier ratios for the next use of the view settings.

In other examples, the vehicle system 100 may rely on at least one machine learning model to adjust one or more view settings. For instance, as shown in FIG. 1, the control module 104 may include a machine learning module 138 including at least one machine learning model, such as a neural network or another suitable model. In other embodiments, the machine learning module 138 may be separate from but in communication with the control module 104. Regardless of location, the machine learning module 138 can generate the view settings for each local region of interest. The control module 104 may then receive (e.g., load) the generated view settings for each local region of interest.

Then, if desired, the machine learning module 138 may adjust the generated view settings as needed. For example, the machine learning module 138 may adjust a view setting for any one of the local regions of interest based on the determined inlier ratios explained above. In such examples, the machine learning module 138 may adjust weights of the machine learning model to optimize numerical values associated with connections between nodes in the machine learning model.

In various embodiments, the vehicle system 100 may control one or more vehicle operations based on the alignment between any one of the cameras 106, 108, 110, 112 and the object, such as another camera, the vehicle 102, and/or the ground. For example, the control module 104 may generate a control signal for the vehicle control module 114 to control an operation of the vehicle 102 based on the alignment and one or more control commands. In doing so, the vehicle system 100 may rely on, among other things, the alignment of any one of the cameras 106, 108, 110, 112 and another object to plan and/or control operations of the vehicle 102, such as a motion or trajectory of the vehicle 102.

Additionally, in some examples, the vehicle system 100 may display an image for the driver and/or passengers in the vehicle 102 based on the alignment between any one of the cameras 106, 108, 110, 112 and another object. For example, the control module 104 may generate a control signal for the display module 116 to cause the display of an image based on the alignment. Then, the driver and/or passengers in the vehicle 102 may be made aware of feature(s) in the surrounding environment.

Figure 4:
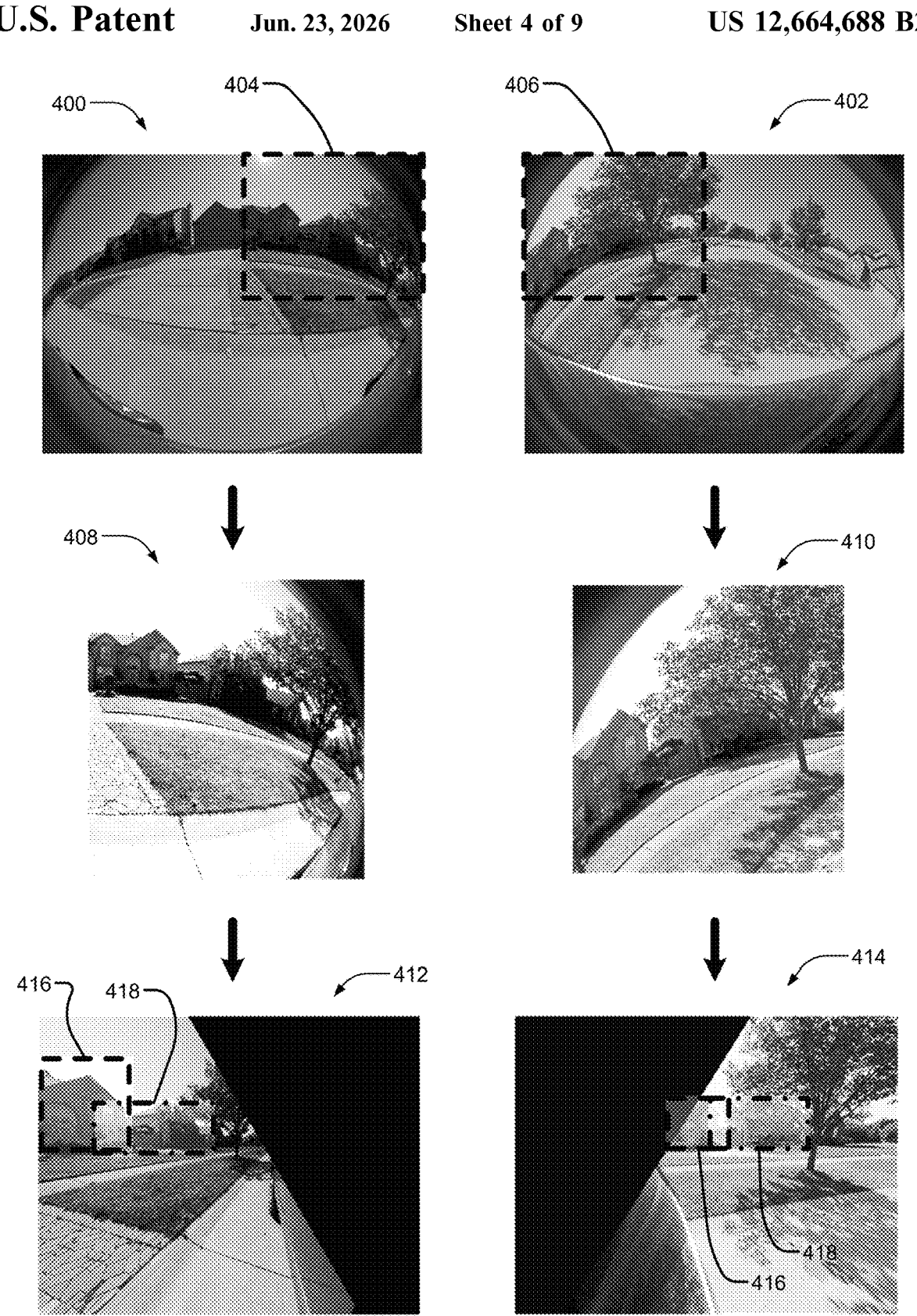
FIG. 4 depicts a series of images, including original images captured by cameras, views of local region of interest, and created synthetic local images, according to the present disclosure.

FIG. 4 depicts examples of original images 400, 402 from different cameras on a vehicle. For example, the original image 400 may be captured from the left-side camera 110 of the vehicle 102 in FIG. 1 while the original image 402 may be captured from the front camera 106 of the vehicle 102.

Then, the control module 104 of FIG. 1 may select corresponding local regions of interest for an identified target feature in the original images 400, 402. For example, in FIG. 4, the local region of interest in the original image 400 is represented by box 404 (and then extracted as an image 408 in FIG. 4), and the local region of interest in the original image 402 is represented by box 406 (and then extracted as an image 410 in FIG. 4). Next, the control module 104 may create synthetic local images 412, 414 based on the local regions of interest, and detect matching features in the synthetic local images 412, 414. In FIG. 4, the detected features are represented by boxes 416, 418. While the detected features in FIG. 4 are generally shown as line or plane features, it should be appreciated that in some examples the detected features may be represented or otherwise identified by one or more specific pixels in the synthetic local images 412, 414. In such examples, the one or more specific pixels may correspond to a corner of a building, a portion of a tree, an intersection point of a sidewalk and a driveway, and/or another detected feature.

FIGS. 5-8 illustrate example processes 500, 600, 700, 800 employable by the vehicle system 100 of FIG. 1 for online camera alignment in a vehicle, such as the vehicle 102 of FIG. 1. Although the example processes 500, 600, 700, 800 are described in relation to the vehicle system 100, the control module 104, and the vehicle 102 of FIG. 1, any one of the control processes 500, 600, 700, 800 may be employable by another suitable vehicle system, control module, and/or vehicle.

Figure 5:
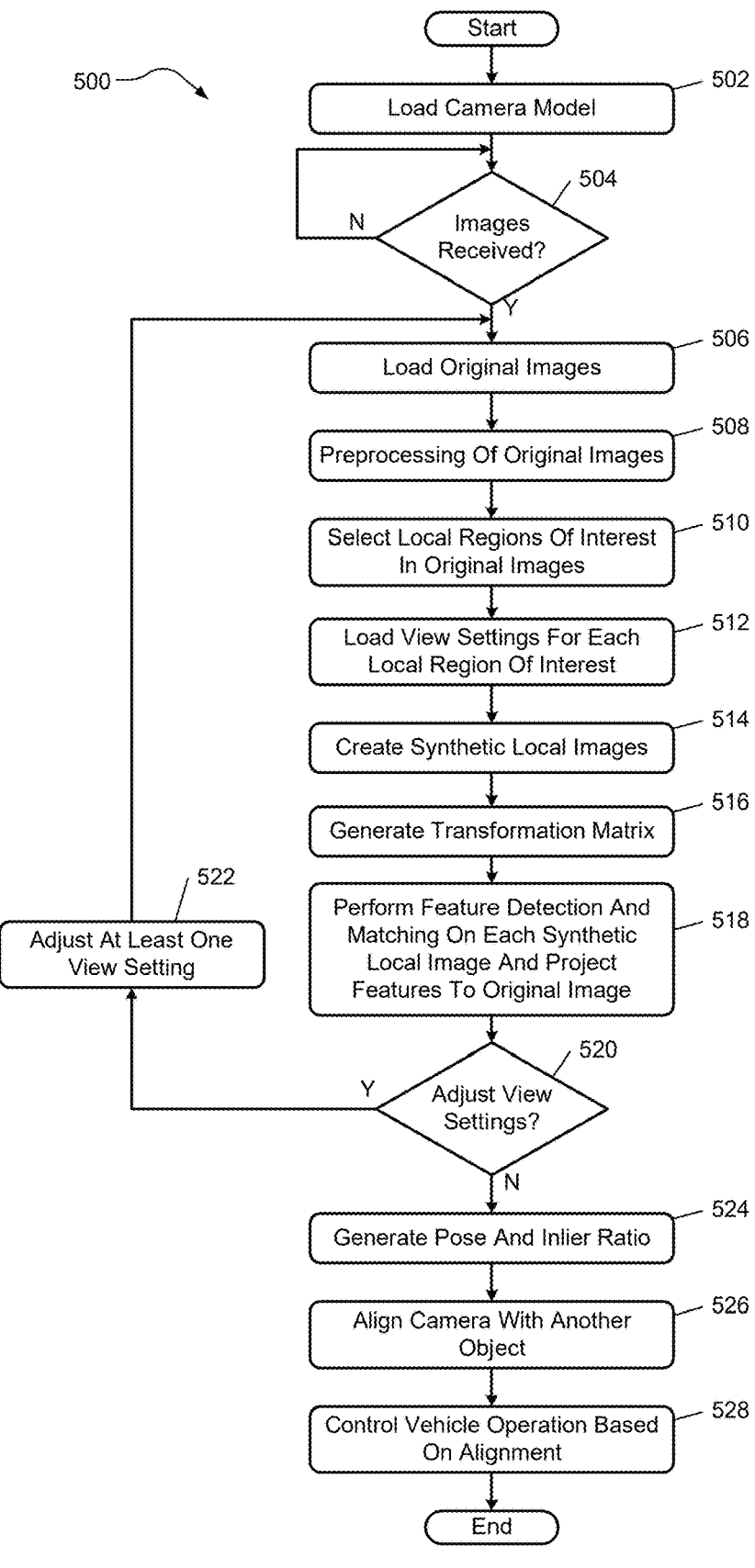
FIGS. 5-8 are flowcharts of example processes for online camera alignment in a vehicle, according to the present disclosure.

As shown in FIG. 5, the process 500 begins at 502 by loading one or more camera models into the control module 104, including for example various coordinate systems for cameras on the vehicle 102, the vehicle 102, and the ground, as explained above. The process 500 then proceeds to 504, where a determination is made to whether original images (or data thereof) are received. If no, the process 500 returns to 504. If yes at 504, the process 500 proceeds to 506 where the control module 104 loads the original images. For example, the control module 104 may receive multiple images from the same camera or different cameras, which can be used for vehicle and ground-based alignments and/or camera-to-camera alignments. For instance, for vehicle and ground-based alignments, the control module 104 may load two consecutive original images (e.g. frames) from the same camera for processing, and for camera-to-camera alignments, the control module 104 may load two different original images having the same timestamp from two different cameras. The process 500 then proceeds to 508, where the original images may be altered (e.g., cropped, undistorted, downsized, etc.) in a pre-processing step. Next, the process 500 proceeds to 510, 512.

At 510, the control module 104 selects local regions of interest in the original images, as explained herein. For instance, the control module 104 may select local regions of interest for an identified target feature in the original images. Then, at 512, the control module 104 loads view settings (e.g., a size and resolution) for each local region of interest. In various embodiments, the view settings may be user defined parameters, generated by a machine learning model, etc. as explained herein. The process 500 then proceeds to 514.

At 514, the control module 104 creates one or more synthetic local images based on the local regions of interest in the original images and the loaded view settings. In such examples, at least one synthetic local image is generated for each original image. For example, and as explained above, each synthetic local image (e.g., birds eye views, views of different perspectives, etc.) may be created for one local region of interest and have different resolutions obtained according to the view settings. The process 500 then proceeds to 516, where the control module 104 generates a transformation matrix to map any detected features between the synthetic local images and the original images. In such examples, the transformation matrix may be a homography transformation matrix, as explained above. Next, the process 500 proceeds to 518.

At 518, the control module 104 detects feature(s) in the synthetic local image(s) and projects the detected feature(s) back to the original images (e.g., back to the original camera coordinate). For example, and as explained above, the control module 104 may detect one or more feature pairs in the multiple synthetic local images (e.g., different views) by matching corresponding features in the synthetic local images. Then, the detected feature pairs may be projected to the original images via the transformation matrix, as explained herein. The process 500 then proceeds to 520.

At 520, the control module 104 determines whether to adjust any of the view settings for local regions of interest. For example, the control module 104 may make this determination based on whether a desired threshold is met. If yes, the process 500 proceeds to 522, where the control module 104 adjusts at least one of the view settings. For example, and as explained above, the control module 104 may remove a view setting corresponding to the lowest inlier ratio, adjust weight(s) of a machine learning model used to generate the view settings, etc. The process 500 then returns to 506. If no at 520, the process 500 proceeds to 524, where the control module 104 generates a pose and inlier ratio associated with the camera capturing the original images. The process 500 then proceeds to 526.

At 526, the control module 104 aligns the camera capturing the original images with another object. For example, and as explained above, the control module 104 may align the camera capturing the original images with another camera (e.g., a camera-to-camera alignment), with the vehicle 102 (e.g., a camera-to-vehicle alignment), and the ground (e.g., a camera-to-ground alignment). The process 500 then proceeds to 528.

At 528, the control module 104 controls an operation of the vehicle 102 based on the alignment. For example, and as explained above, the control module 104 may generate a control signal for the vehicle control module 114, which can rely on the alignment of the camera to plan and/or control operations of the vehicle 102, such as a motion or trajectory of the vehicle 102. The process 500 then ends as shown in FIG. 5 or may optionally return to 504 or another suitable step.

Figure 6:
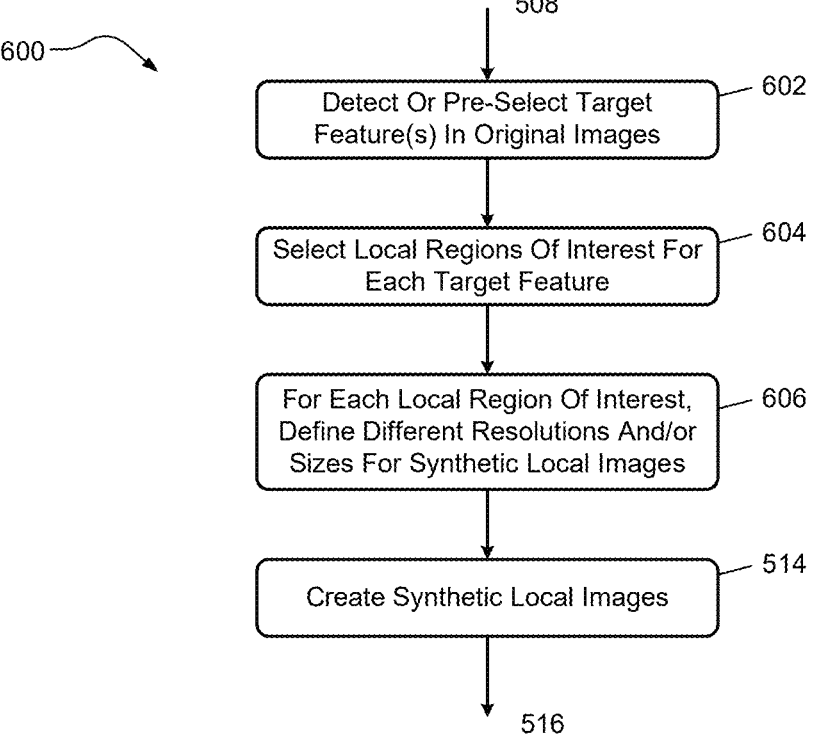

The process 600 of FIG. 6 depicts one example implementation of selecting local regions of interest in step 512 of the process 500 in FIG. 5. As shown in FIG. 6, the process 600 begins at 602 (following step 508 of FIG. 5), where the control module 104 identifies one or more target features in the original images. For example, and as explained above, the control module 104 may detect the target feature(s) in the original images by using a suitable image segmentation method. In other examples, the target feature(s) may be pre-selected and identified by the control module 104. The process 600 then proceeds to 604, where the control module 104 selects local regions of interest for each identified target feature in the original images, as explained herein. Next, the process 600 then proceeds to 606, where the control module 104, for each local region of interest, defines different resolutions and/or sizes. The process 600 then proceeds to 514 of FIG. 5, where the control module 104 relies on the different resolutions and/or sizes for the creation of the synthetic local images, as explained herein. The process 600 then may proceed to step 516 of FIG. 5 explained above.

Figure 7:
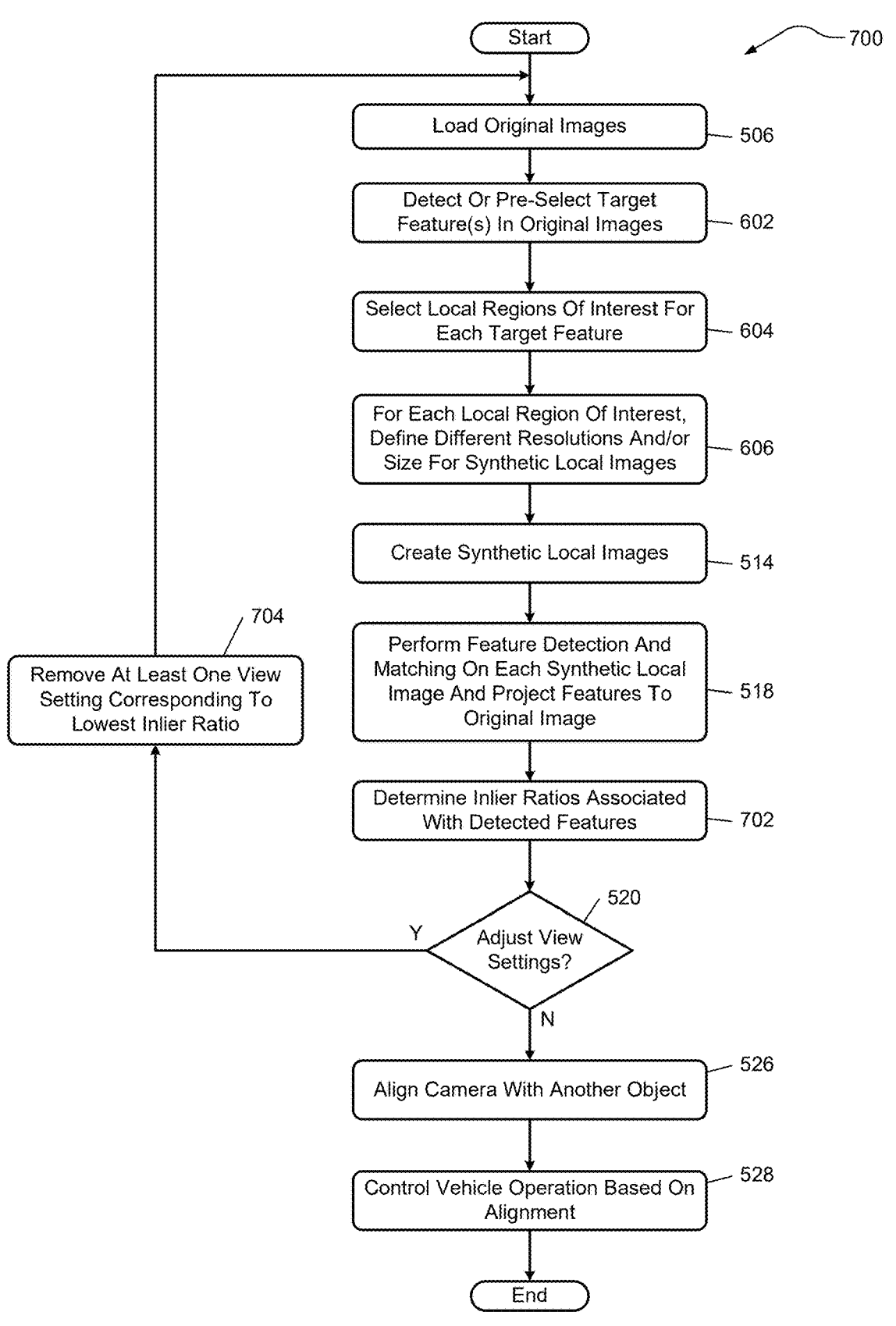

In FIG. 7, the process 700 is similar to the processes 500, 600 of FIGS. 5-6 but includes additional steps. For example, and as shown in FIG. 7, the process 700 begins at 506 of FIG. 5 where the control module 104 loads the original image. Then, the process 700 proceeds to 602, 604, 606, 514, 518 as explained above relative to FIGS. 5-6. Next, the process 700 proceeds to 702, where the control module 104 determines inlier ratios associated with multiple features or feature pairs detected in 518. The process 700 then proceeds to 520 of FIG. 5.

At 520, the control module 104 determines whether to adjust any of the view settings for local regions of interest, as explained above. If yes, the process 700 proceeds to 704, where the control module 104 removes at least one of the view settings corresponding to the lowest inlier ratio. The process 700 then returns to 506. If no at 520, the process 700 proceeds to 526, 528 as explained above relative to FIG. 5. The process 700 then ends as shown in FIG. 7 or may optionally return to 504 or another suitable step.

Figure 8:
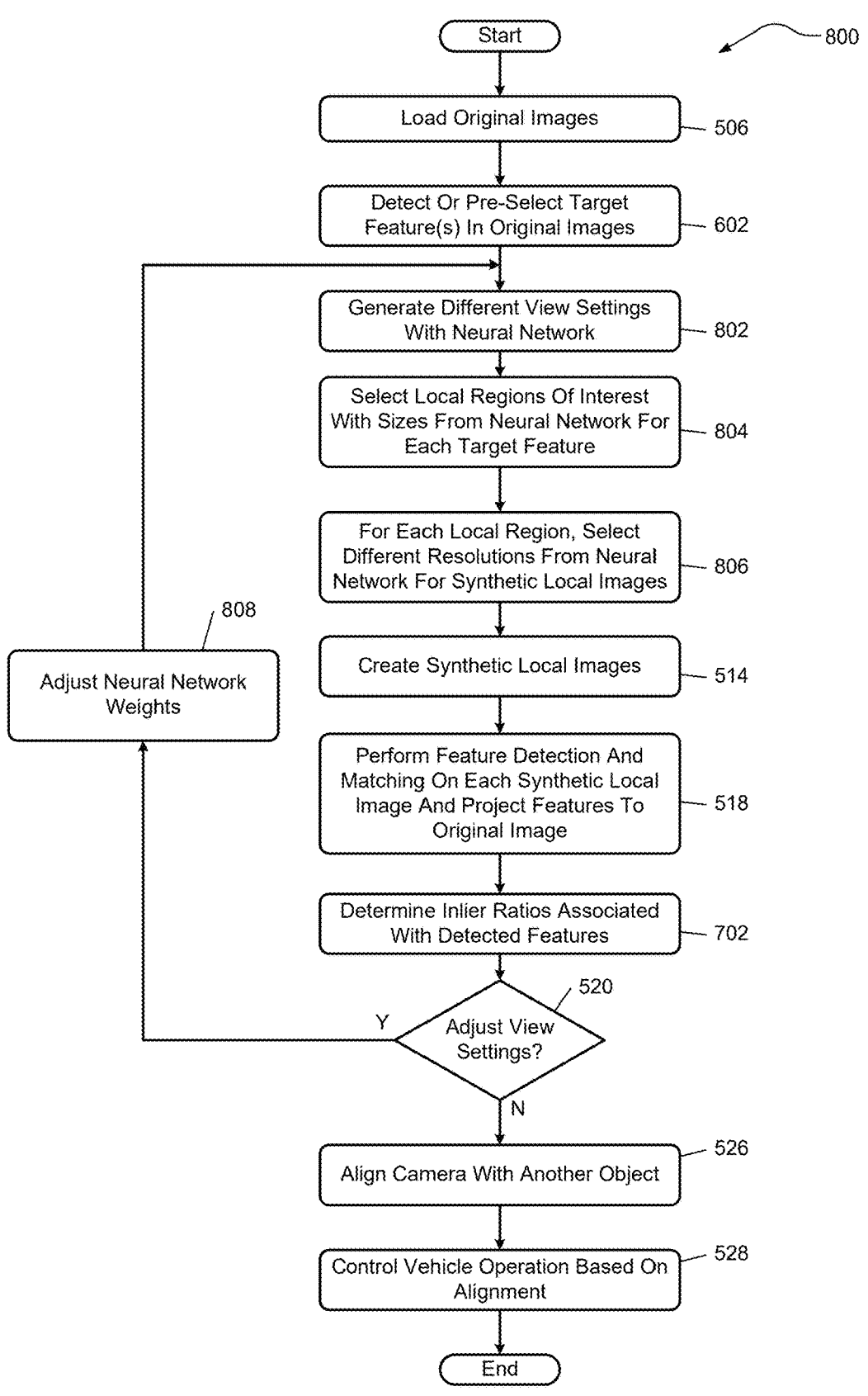

In FIG. 8, the process 800 is similar to the processes 500, 600, 700 of FIGS. 5-7 but includes additional and/or alternative steps. For example, and as shown in FIG. 8, the process 800 begins at 506 of FIG. 5 where the control module 104 loads the original image. Then, the process 800 proceeds to 602 as explained above relative to FIG. 6. Next, the process 800 proceeds to 802, where different view settings (e.g., sizes, resolutions, etc.) are generated by a machine learning model, such as a neural network. The process 800 then proceeds to 804, 806.

At 804, the control module 104 selects local regions of interest with different sizes generated by the machine learning model. This is done for each identified target feature in the original image. At 806, the control module 104 selects, for each local region of interest, different resolutions generated by the machine learning model for synthetic local images that will be created. The process 800 then proceeds to 514, 518, 702 as explained above relative to FIGS. 5 and 7. Next, the process 800 proceeds to 520 of FIG. 5.

At 520, the control module 104 determines whether to adjust any of the view settings for local regions of interest, as explained above. If yes, the process 800 proceeds to 808, where weights used to generate the view settings in the machine learning model are adjusted. This may be done to optimize numerical values associated with connections between nodes in the machine learning model. The process 800 then returns to 802. If no at 520, the process 800 proceeds to 526, 528 as explained above relative to FIG. 5. The process 800 then ends as shown in FIG. 8 or may optionally return to 504 or another suitable step.

Figure 9:
FIGS. 9-10 are graphs showing roll angles associated with a vehicle camera using a conventional camera alignment method and using an online camera alignment according to the present disclosure.
Figure 9:
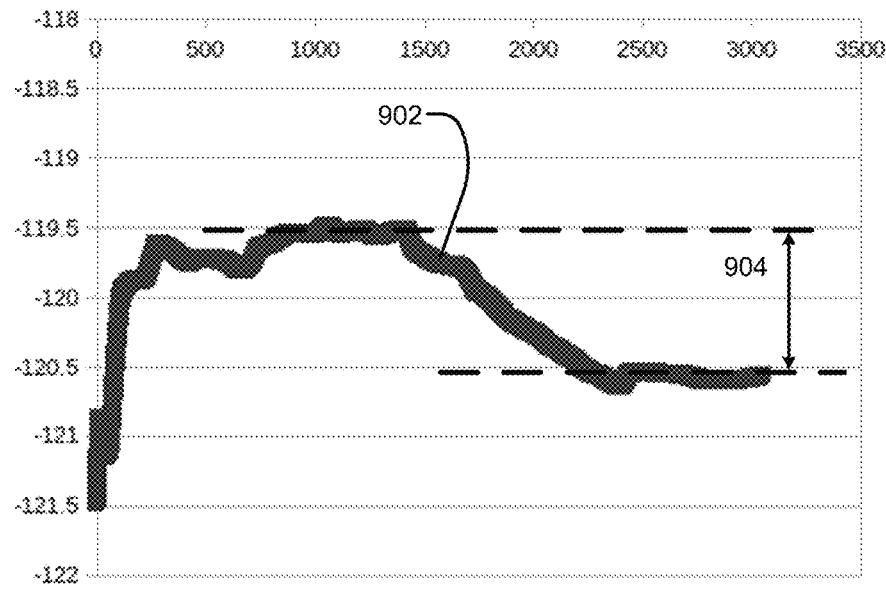
Figure 10:
Figure 10:
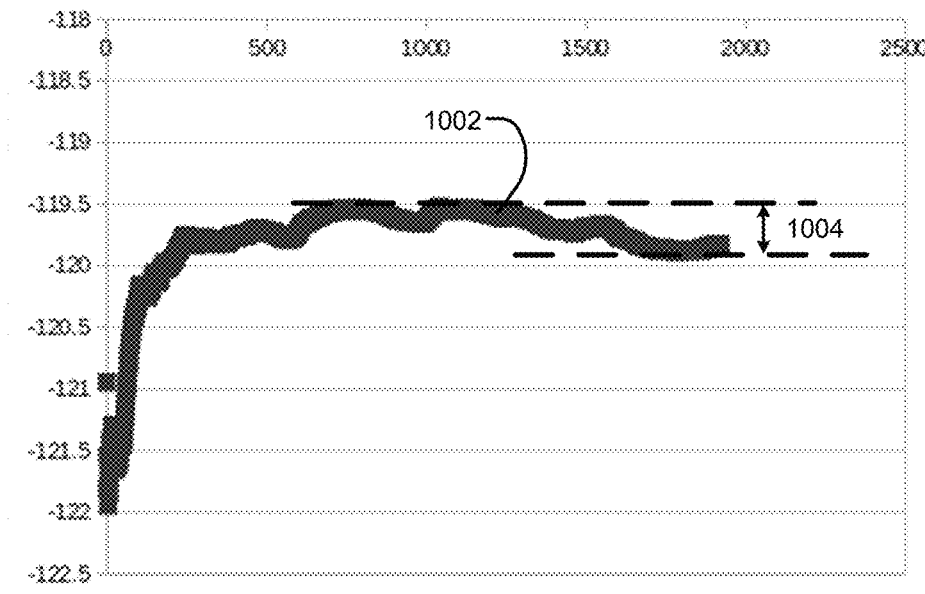

The vehicle systems and methods described herein improve camera alignment accuracy as compared to conventional methods for aligning cameras. For example, FIG. 9 depicts a graph 900 showing a roll angle 902 associated with a vehicle's right-side camera aligned using a conventional camera alignment method, and FIG. 10 depicts a graph 1000 showing a roll angle 1002 associated with a vehicle's right-side camera aligned using the camera alignment methods described herein. As shown, a degree change (represented by line 1004) between a maximum and a minimum after stabilization for the roll angle 1002 is less than a degree change (represented by line 904) between a maximum and a minimum after stabilization for the roll angle 902. Specifically, the degree change for the roll angle

1002 is about 0.5 degrees whereas the degree change for the roll angle 902 is about 1.0 degrees.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for a vehicle, the vehicle system comprising:
one or more cameras configured to capture original images relative to the vehicle; and
a control module in communication with the camera, the control module configured to:
receive at least two original images from the one or more cameras of the vehicle;
identify at least one target feature in the original images;
select local regions of interest for the identified target feature in the original images;
load view settings for each local region of interest, the view settings for each local region of interest including at least a size and a resolution;
adjust at least one of the view settings for the local regions of interest;
create one or more synthetic local images for each original image based on the local regions of interest and the loaded view settings;
detect at least one feature in the one or more synthetic local images; and
align the camera with an object associated with the vehicle using the detected feature, wherein the object is the vehicle, the ground, or another camera of the vehicle,
wherein the control module includes a machine learning module configured to generate the view settings for each local region of interest, and the control module is configured to receive the view settings for each local region of interest from the machine learning module.

2. The vehicle system of claim 1, wherein the control module is configured to control an operation of the vehicle based on the alignment between the camera and the object.

3. The vehicle system of claim 2, wherein the operation of the vehicle includes a motion or trajectory of the vehicle.

4. The vehicle system of claim 1, wherein the machine learning module includes a neural network.

5. The vehicle system of claim 1, wherein:
the control module is configured to determine inlier ratios associated with a plurality of detected features; and
the machine learning module is configured to adjust the at least one of the view settings for the local regions of interest based on the determined inlier ratios.

6. The vehicle system of claim 1, wherein the control module is configured to generate a transformation matrix to map the detected feature between the synthetic local images and at least one of the original images.

7. The vehicle system of claim 6, wherein the control module is configured to project the target feature back to the at least one of the original images based on the transformation matrix.

8. The vehicle system of claim 7, wherein the transformation matrix is a homography transformation matrix.

9. A method for aligning one or more cameras of a vehicle with an object associated with the vehicle, the method comprising:

receiving at least two original images from the one or more cameras;

identifying at least one target feature in the original images;

selecting local regions of interest for the identified target feature in the original images;

loading view settings for each local region of interest, the view settings for each local region of interest including at least a size and a resolution;

adjusting the at least one of the view settings for the local regions of interest by determining inlier ratios associated with a plurality of detected features and removing at least one of the view settings corresponding to the lowest inlier ratio of the inlier ratios:

creating one or more synthetic local images for each original image based on the local regions of interest and the loaded view settings;

detecting at least one feature in the one or more synthetic local images; and aligning the camera with an object associated with the vehicle using the detected feature, wherein the object is the vehicle, the ground, or a second camera of the vehicle.

10. The method of claim 9, further comprising controlling an operation of the vehicle based on the alignment between the camera and the object.

11. The method of claim 10, wherein the operation of the vehicle includes a motion or trajectory of the vehicle.

12. The method of claim 9, wherein loading the view settings for each local region of interest includes generating, with a machine learning module, the view settings for each local region of interest.

13. The method of claim 9, further comprising generating a transformation matrix to map the detected feature between the synthetic local images and at least one of the original images.

14. The method of claim 13, further comprising projecting the target feature back to the at least one of the original images based on the transformation matrix.

15. A vehicle system for a vehicle, the vehicle system comprising:

one or more cameras configured to capture original images relative to the vehicle; and a control module in communication with the camera, the control module configured to:

receive at least two original images from the one or more cameras of the vehicle;

identify at least one target feature in the original images;

select local regions of interest for the identified target feature in the original images;

load view settings for each local region of interest, the view settings for each local region of interest including at least a size and a resolution;

adjust at least one of the view settings for the local regions of interest by determining inlier ratios associated with a plurality of detected features and removing at least one of the view settings corresponding to the lowest inlier ratio of the inlier ratios;

create one or more synthetic local images for each original image based on the local regions of interest and the loaded view settings;

detect at least one feature in the one or more synthetic local images; and align the camera with an object associated with the vehicle using the detected feature, wherein the object is the vehicle, the ground, or another camera of the vehicle.

16. The vehicle system of claim 15, wherein the control module is configured to control an operation of the vehicle based on the alignment between the camera and the object.

17. The vehicle system of claim 16, wherein the operation of the vehicle includes a motion or trajectory of the vehicle.

18. The vehicle system of claim 15, wherein the control module is configured to generate a transformation matrix to map the detected feature between the synthetic local images and at least one of the original images.

19. The vehicle system of claim 18, wherein the control module is configured to project the target feature back to the at least one of the original images based on the transformation matrix.

20. The vehicle system of claim 18, wherein the transformation matrix is a homography transformation matrix.

* * * * *